United States Patent
Frey, Jr. et al.

(10) Patent No.: US 7,149,847 B2
(45) Date of Patent: *Dec. 12, 2006

(54) RAID 6 DISK ARRAY ARCHITECTURES

(75) Inventors: Alexander Hamilton Frey, Jr., Wayzata, MN (US); Tommy Robert Treadway, Winter Springs, FL (US); Sanjeeb Nanda, Winter Springs, FL (US)

(73) Assignee: Adaptec, Inc., Milpitas, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 11/064,392

(22) Filed: Feb. 23, 2005

(65) Prior Publication Data

US 2005/0166083 A1    Jul. 28, 2005

Related U.S. Application Data

(63) Continuation-in-part of application No. 10/607,381, filed on Jun. 26, 2003.

(51) Int. Cl.
*G06F 12/16*    (2006.01)

(52) U.S. Cl. .......................... 711/114; 714/6

(58) Field of Classification Search ............ None
See application file for complete search history.

(56) References Cited

U.S. PATENT DOCUMENTS

| | | | | |
|---|---|---|---|---|
| 5,499,253 A | * | 3/1996 | Lary | ........................ 714/770 |
| 5,790,774 A | | 8/1998 | Sarkozy | |
| 5,805,788 A | | 9/1998 | Johnson | |
| 5,862,158 A | * | 1/1999 | Baylor et al. | ............... 714/800 |
| 6,000,010 A | | 12/1999 | Legg | |
| 6,101,615 A | * | 8/2000 | Lyons | ............................ 714/6 |
| 6,138,125 A | * | 10/2000 | DeMoss | ..................... 707/202 |
| 6,148,430 A | | 11/2000 | Weng | |
| 6,158,017 A | * | 12/2000 | Han et al. | ...................... 714/6 |
| 6,327,672 B1 | * | 12/2001 | Wilner | .......................... 714/6 |
| 6,353,895 B1 | * | 3/2002 | Stephenson | .................... 714/5 |
| 6,453,428 B1 | * | 9/2002 | Stephenson | .................... 714/6 |
| 6,484,269 B1 | * | 11/2002 | Kopylovitz | .................... 714/5 |

(Continued)

OTHER PUBLICATIONS

Chih-Shing Tau and Tzone-I Wang, Efficient Parity Placement Schemes for Tolerating Triple Disk Failures in RAID Architectures, 2003, IEEE, p. 1-2 [retrieved on May 8, 2006]. Retrieved from: IEEE Database.*

*Primary Examiner*—Reginald G. Bragdon
*Assistant Examiner*—Thanh D. Vo
(74) *Attorney, Agent, or Firm*—W. David Sartor; Beusse Wolter Sanks Mora & Maire, P.A.

(57) ABSTRACT

A system and method for providing multiple disk fault tolerance in an N-column by R-row logical representation of stored elements in an array of N independent disks, R minus 1 being less than N divided by a number of disk failures F, includes assigning each strip containing data to at least F different parity groups so that each strip containing data in a respective column is assigned to parity groups different than other strips containing data in the column. The method also includes calculating, for each parity group, a parity value corresponding to all of the strips assigned to the parity group. The method further includes storing each of the parity values in strips of different columns, so that none of the strips containing data in a column are assigned to a parity group for which the parity value for the parity group is stored in the column.

9 Claims, 4 Drawing Sheets

U.S. PATENT DOCUMENTS

| | | | |
|---|---|---|---|
| 6,807,605 B1* | 10/2004 | Umberger et al. | 711/114 |
| 6,851,082 B1* | 2/2005 | Corbett | 714/770 |
| 2002/0095616 A1* | 7/2002 | Busser | 714/8 |
| 2003/0084397 A1* | 5/2003 | Peleg | 714/770 |
| 2003/0163757 A1* | 8/2003 | Kang et al. | 714/6 |
| 2003/0167439 A1* | 9/2003 | Talagala et al. | 714/770 |
| 2003/0233611 A1* | 12/2003 | Humlicek et al. | 714/763 |
| 2004/0250161 A1* | 12/2004 | Patterson | 714/6 |

* cited by examiner

| Columns | 1 | 2 | 3 | ... | N-1 | N |
|---|---|---|---|---|---|---|
| 1 | {GA$_{1,1}$, GB$_{1,1}$} | {GA$_{1,2}$, GB$_{1,2}$} | {GA$_{1,3}$, GB$_{1,3}$} | ... | {GA$_{1,N-1}$, GB$_{1,N-1}$} | {GA$_{1,N}$, GB$_{1,N}$} |
| 2 | {GA$_{2,1}$, GB$_{2,1}$} | {GA$_{2,2}$, GB$_{2,2}$} | {GA$_{2,3}$, GB$_{2,3}$} | ... | {GA$_{2,N-1}$, GB$_{2,N-1}$} | {GA$_{2,N}$, GB$_{2,N}$} |
| 3 | {GA$_{3,1}$, GB$_{3,1}$} | {GA$_{3,2}$, GB$_{3,2}$} | {GA$_{3,3}$, GB$_{3,3}$} | ... | {GA$_{3,N-1}$, GB$_{3,N-1}$} | {GA$_{3,N}$, GB$_{3,N}$} |
| ... | ... | ... | ... | ... | ... | ... |
| R-1 | {GA$_{R-1,1}$, GB$_{R-1,1}$} | {GA$_{R-1,2}$, GB$_{R-1,2}$} | {GA$_{R-1,3}$, GB$_{R-1,3}$} | ... | {GA$_{R-1,N-1}$, GB$_{R-1,N-1}$} | {GA$_{R-1,N}$, GB$_{R-1,N}$} |
| R | {P$_1$} | {P$_2$} | {P$_3$} | | {P$_{N-1}$} | {P$_N$} |

Rows

Fig. 2

|   | Columns | | | | | |
|---|---|---|---|---|---|---|
| Rows | 1 | 2 | 3 | 4 | 5 | 6 |
| 1 | {1,4} | {2,1} | {3,5} | {4,2} | {5,6} | {6,3} |
| 2 | {2,3} | {4,6} | {6,2} | {1,5} | {3,1} | {5,4} |
| 3 | {5} | {3} | {1} | {6} | {4} | {2} |

RAID 6 DISK ARRAY ARCHITECTURES

This application is a continuation-in-part of U.S. patent application Ser. No. 10/607,381 and it claims benefit of the Jun. 26, 2003 filing date thereof.

BACKGROUND OF THE INVENTION

1. Field of the Invention

The present invention is generally related to disk array architectures, and, specifically, to a RAID architecture, for providing two or more disk fault tolerance.

2. Related Art

It is known how to store data in an array of disks managed by an array controller to control the storage and retrieval of data from the array is known. One example of such a system is a Redundant Array of Independent Disks (RAID) comprising a collection of multiple disks organized into a disk array managed by a common array controller. The array controller presents the array to the user as one or more virtual disks. Disk arrays are the framework to which RAID functionality is added in functional levels to produce cost-effective, high-performance disk systems having varying degrees of reliability based on the type of RAID architecture implemented. RAID architecture can be conceptualized in two dimensions as individual disks arranged in adjacent columns. Typically, each disk is partitioned with several identically sized data partitions known as strips, or minor stripes. Distributed across the array of disks in rows, the identically sized partitioned strips form a data stripe across the entire array of disks. Therefore, the array contains stripes of data distributed as rows in the array, wherein each disk is partitioned into strips of identically partitioned data and only one strip of data is associated with each stripe in the array.

As is known, RAID architectures have been standardized into several categories. RAID level 0 is a performance-oriented striped data mapping technique incorporating uniformly sized blocks of storage assigned in a regular sequence to all of the disks in the array. RAID level 1, also called mirroring, provides simplicity and a high level of data availability, but at a relatively high cost due to the redundancy of the disks. RAID level 3 adds redundant information in the form of parity data to a parallel accessed striped array, permitting regeneration and rebuilding of lost data in the event of a single-disk failure. RAID level 4 uses parity concentrated on a single disk to allow error correction in the event of a single disk failure, but the member disks in a RAID 4 array are independently accessible. In a RAID 5 implementation, parity data is distributed across some or all of the member disks in the array. Thus, the RAID 5 architecture achieves performance by striping data blocks among N disks, and achieves fault-tolerance by using 1/N of its storage for parity blocks, calculated by taking the exclusive-or (XOR) of all data blocks in the parity disks row. A RAID 6 architecture is similar to RAID 5, but RAID 6 can overcome the failure of any two disks by using an additional parity block for each row (for a storage loss of 2/N). In one example of a RAID 6 architecture, the first parity block (P) is calculated with XOR of the data blocks. The second parity block (Q) employs Reed-Solomon codes. One drawback of the known RAID 6 implementation is that it requires a complex and computationally time-consuming array controller to implement the Reed-Solomon codes necessary to recover from a two-disk failure. The complexity of Reed-Solomon codes may preclude the use of such codes in software, or may necessitate the use of expensive special purpose hardware. Thus, implementation of Reed-Solomon codes in a disk array increases the cost, complexity, and processing time of the array.

In addition, other schemes have been proposed to implement a two-disk fault protection, but the reconstruction sequences used in such schemes may be dependent on prior strips being recreated before a predetermined strip can be reconstructed. For example, in an R-row by N-column array, an average dependency length, or number of strips required to be reconstructed before a desired strip can be reconstructed, is approximately equal to N. The reconstruction sequences used in such schemes may be dependent on as many as 2N prior strips being recreated before a predetermined strip can be reconstructed. Also, $N^2$ strips may be needed in memory for encoding and decoding the set in the N by N array.

SUMMARY OF THE INVENTION

An method of providing multiple disk fault tolerance in an N-column by R-row logical representation of a set of data elements in an array of independent disks is disclosed herein, N being equal to one less than a prime number P, and R being equal to half of one less than PN. The data in the set is organized into a plurality of stripes, each stripe comprising a plurality of strips, and all strips of a column are located on the same disk. One and only one parity value is stored per column per set. The method includes assigning each strip containing data to at least two different parity groups so that each strip containing data in a respective column is assigned to parity groups different than other strips containing data in the same column. The method further includes calculating, for each parity group, a parity value corresponding to all of the strips assigned to the parity group and storing each of the parity values in strips of different columns so that none of the strips containing data in a column are assigned to a parity group whose parity value is stored in that column. Data stored in the array may be recovered by using intact members of the respective parity group and the stored parity of the respective parity group.

BRIEF DESCRIPTION OF THE DRAWINGS

The present invention will become apparent from the following detailed description of the invention when read with the accompanying drawings in which:

FIG. 2 illustrates an exemplary logical representation of a disk array storage format.

FIG. 4 illustrates an exemplary array configured for providing multiple disk failure fault tolerance.

Figure 1:
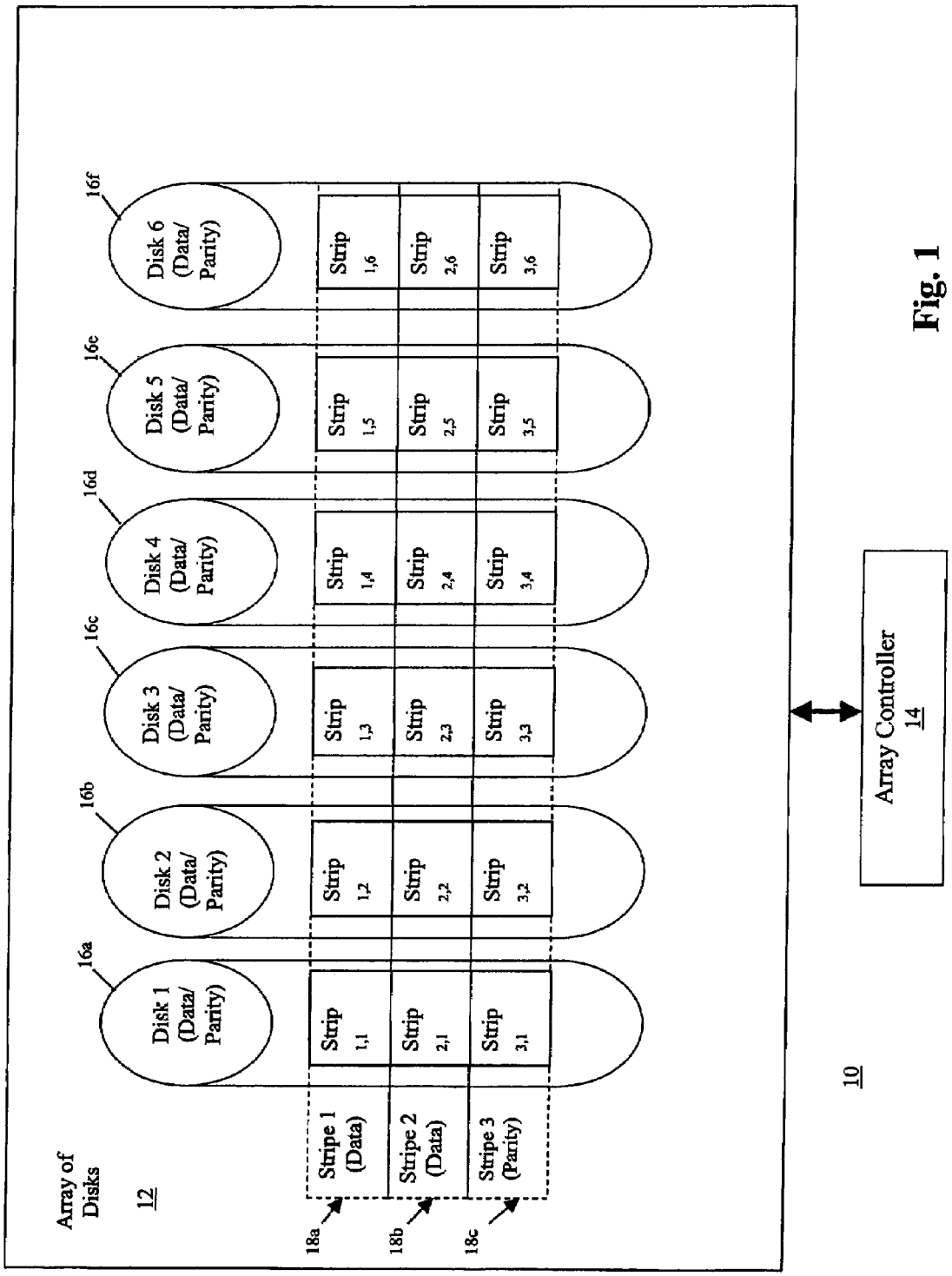
FIG. 1 illustrates an exemplary block diagram representation of a fault tolerant data storage system.

In certain situations, for reasons of computational efficiency or ease of maintenance, the ordering of the blocks of the illustrated flow chart could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

FIG. 1 illustrates a data storage system 10 including an array of disks 12 for storing data and an array controller 14 for controlling the storage and retrieval of data in the array 12. In one aspect of the invention, the system 10 may be configured as a RAID 6 type architecture, as understood by a skilled artisan. The array controller 14, coupled to the array of disks 12, allocates logical units, or strips, into logical rows, or stripes, extending across the physical disks in the array 12. Each disk in the array 12 may be consecutively indexed, each stripe in the array 12 may be consecutively indexed, and each strip may be indexed according to the corresponding disk and stripe membership. For example, the array 12 depicted in FIG. 1 includes six disks, disks 1–6 (16a–16f), allocated with three stripes, stripes 1–3 (18a–18c), so that each disk includes three strips indexed by both disk and stripe membership, and each stripe includes six strips allocated across the disks. Although FIG. 1, for the sake of simplicity of illustration, illustrates a six disk array 12 configured to include three stripes (18a–18c), it will be understood that the present invention is not limited to a specific number of physical disks or a specific number of stripes, provided the number of disks in the array is a prime number minus one or the number of disks in the array is divided into sets of disks, each set of disks having a prime number minus one disks. The data storage and recovery technique described herein may be implemented in reconstruction set sections contiguously configured throughout a RAID array, provided each of the reconstruction sets complies with the format as described herein.

In an embodiment, the array 12 of disks can be mapped by the array controller 14 into one or more N-column by R-row logical representations of data elements. For each section of the array mapped into an N-column by R-row logical representation, a stripe is reserved for storing array reconstruction information. For example, the highest indexed stripe (18c), or parity stripe, can be reserved for storing parity values corresponding to parity groups defined in the section. The remaining stripes in the array section (18a and 18b), can then be used to store data.

FIG. 2 illustrates an exemplary logical representation of a set of data elements in a disk array storage format. In an aspect of the invention, the disk array is partitioned into a plurality of logically represented N-column by R-row sets, N being one less than a prime number, P, and R being equal to half of N, so that the columns correspond to the disks in the array and the rows extend across all the disks in the array. This configuration may be repeated as reconstruction sets throughout the entire array. For example, an N by 2R disk array may be configured to a have two contiguous N by R reconstruction sets.

Generally, the data in each set in the disk array is organized into a plurality of stripes, each stripe comprising a plurality of strips, and one and only one parity value stored per column, per set. Each set is configured by assigning each strip containing data to at least two different parity groups, so that each strip containing data in a respective column is assigned to parity groups different than other strips containing data in the column. Accordingly, a member of a parity group will appear only once in a column, and all other members of the group, including the parity value, will appear in respective different columns. In an array of N disks, each parity group of each set has (N−2) data strips and one parity strip as its members.

Parity values corresponding to all of the strips assigned to the parity group are then calculated for each parity group. For example, the parity values for each parity group may be calculated by computing the exclusive-or (XOR) of the information in each data strip assigned to the respective parity group. Each of the parity values are then stored in strips of different columns, so that none of the strips containing data in a column are assigned to a parity group whose parity value is stored in that column. In one form, a row of each reconstruction sets, such as the last row of the set, may be reserved for storing the parity values.

As shown in FIG. 2, data may be stored in columns 1 to N and in rows 1 to (R−1). Row R is reserved for parity values. Each data strip in the array belongs to two different parity groups and is used for the calculation of the parities corresponding to those two groups. Thus, parity group membership for each data strip can be indicated by a 2-tuple, the first value in the tuple representing membership in a first parity group, the second value in the tuple indicating membership in a second parity group. For example, in the representative 2-tuple $\{GA_{r,c}, GB_{r,c}\}$, the first coordinate $GA_{r,c}$, represents the ordinal value of the first parity group to which the current data strip belongs, with the subscript r indicates the current row location, and the subscript c represents the current column location of the data strip. The second coordinate, $GB_{r,c}$, represents the ordinal value of the second parity group to which the current data strip belongs. In an aspect of the invention, membership of the current data element in a first parity group $GA_{r,c}$, whose value is calculated using the formula (1):

$$GA_{r,c} = (r \times c) \bmod P; \quad (1)$$

where P is the prime number equal to N (the number of disks in the array) plus 1, and "x" indicates the multiplication function.

Membership in a second parity group $GB_{r,c}$, whose value is calculated using the formula (2):

$$GB_{r,c} = [(N-1-r) \times c] \bmod P. \quad (2)$$

Parity value for each parity group is assigned to the parity strip denoted by the same ordinal value $p_c$ (as the parity group) and calculated using the formula (3):

$$p_c = [(N-1) \times c] \bmod P; \quad (3)$$

where c is the current column location of the strip for storing the assigned parity value.

Formulas (1), (2), and (3) ensure that no parity group member (including data strip members and the parity value for the group) appears more than once in a column of a set. Conversely, a parity group member stored in a column belongs to a parity group different from all other members stored in the column of the set.

The inventor has experimentally demonstrated that the formulas described above prevent the occurrence of any cyclic path of parity group pairs. A path of parity group pairs is a sequence of 2-tuples of the form $\{GA_{r,c}, GB_{r,c}\}$ where each 2-tuple except the first and last one in the sequence, shares a common coordinate (i.e., a parity group) with the previous and another common coordinate with the succeeding 2-tuple in the sequence. The first 2-tuple in the sequence shares a common coordinate with only the succeeding 2-tuple in the sequence, and the last 2-tuple in the sequence shares a common coordinate with only the previous 2-tuple in the sequence. A cyclic path of parity group pairs is then a path of parity group pairs where each and every 2-tuple in the sequence shares a common coordinate (i.e., a parity group) with the previous and another common coordinate with the succeeding 2-tuple in the sequence. Furthermore the inventor has experimentally demonstrated that each and every strip on a pair of failed disks belongs to a non-cyclic path of parity group pairs. These aforementioned properties are equivalent to the Property A described below. These properties allow reconstruction of the set in the case of two simultaneously failed disks in the array.

If two disks in an array fail, for example, simultaneously or a second disk fails while a first disk is being reconstructed, the contents of a data strip on a failed disk can be reconstructed if the remaining member strips of at least one of the parity groups to which the data strip belongs is intact. Accordingly, to reconstruct a strip on either of the failed disks, a data strip on either of the failed disks must be identified so that none of the remaining members of one of the parity groups to which the identified data strips belongs appears on either of the failed disks.

Figure 3:
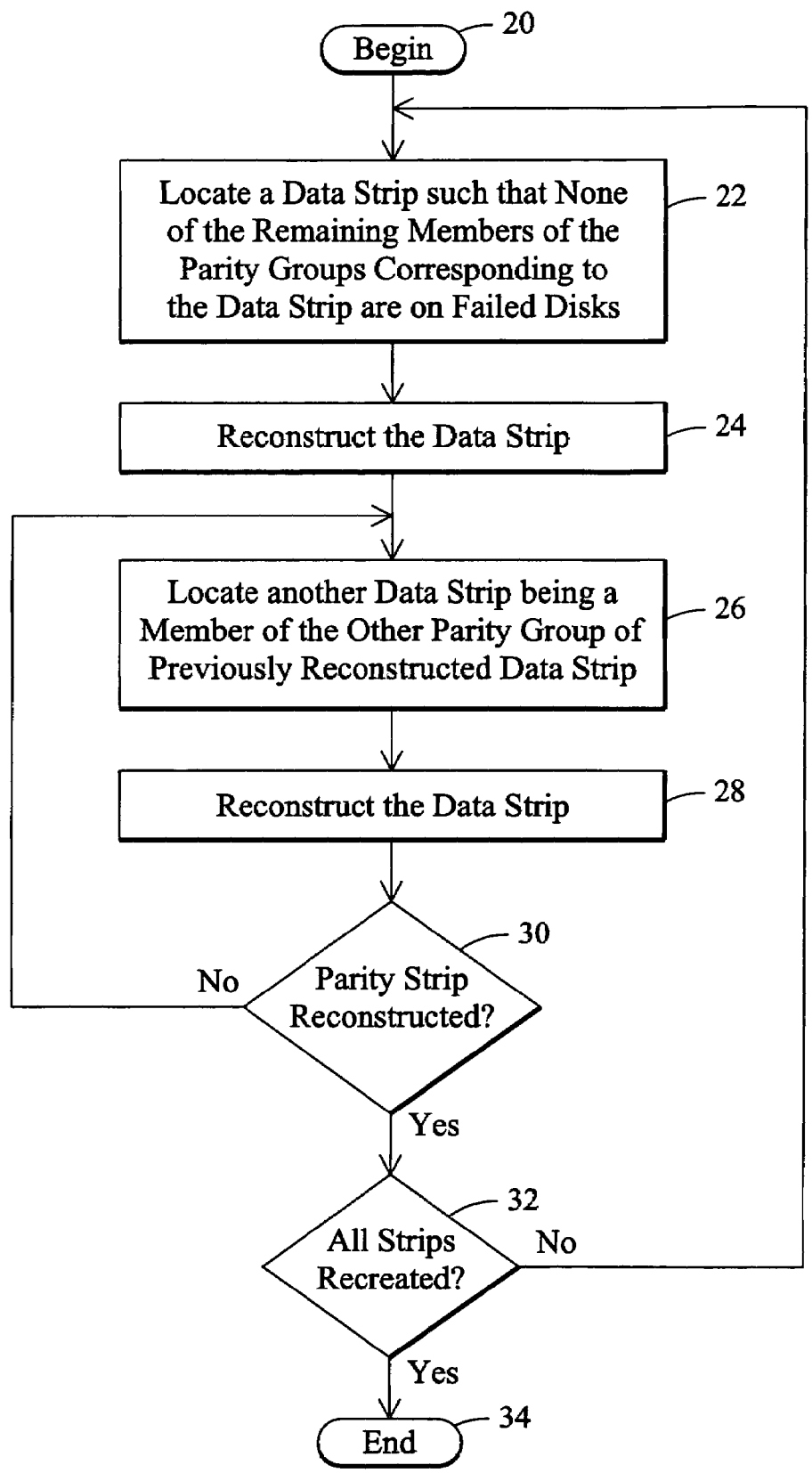
FIG. 3 is an exemplary flow chart illustrating a method of providing disk fault tolerance in an array of disks.

FIG. 3 is a flow chart illustrating a method of providing disk fault tolerance in an array of disks. For example, if two arbitrary disks, $d_i$ and $d_j$, where $1 \leq i, j \leq N$, fail, the contents of a strip $(r, c)_1$ located on row r and column c of the failed disk can be reconstructed if the remaining member strips of at least one of the parity groups $G_1$ or $G_2$ to which the strip belongs are intact. As shown in FIG. 3, the reconstruction procedure begins 20 by locating a data strip $(r, c)_1$ on either $d_i$ or $d_j$ such that none of the remaining members of one of the parity groups $G_1$ or $G_2$ (of which the strip $(r, c)_1$ is a member) appear in either failed disk $d_i$ or $d_j$ 22. Without loss of generality, assuming the data strip $(r, c)_1$ occurs on the damaged disk $d_i$, and none of the other members of the parity group $G_1$ appear on disks $d_i$ or $d_j$, the data strip $(r, c)_1$ can be reconstructed 24 using the surviving member strips (including the parity strip) of the parity group $G_1$. After the data strip $(r, c)_1$ is reconstructed, a second data strip $(r, c)_2$ is located, for example, on disk $d_j$, that is a member of the parity group $G_2$ and $G_3$ 26. The second data strip $(r, c)_2$, belonging to the parity group $G_2$, can be reconstructed 28 because the first strip $(r, c)_1$ that has been already reconstructed is also a member of parity group $G_2$, and there can be at most two strips of any parity group on disks $d_i$ and $d_j$. Next, we locate a third data strip $(r, c)_3$ on disk $d_i$ that is a member of the parity group $G_2$ and $G_3$ The third data strip $(r, c)_3$, belonging to the parity group $G_3$, can be reconstructed because the second strip $(r, c)_2$ that has been already reconstructed is also a member of parity group $G_3$, and there can be at most two strips of any parity group on disks $d_i$ and $d_j$.

Data strips can be sequentially reconstructed in this manner by reconstructing a data strip and then identifying another failed strip that is a member of at least one of the parity groups that the previously reconstructed strip is a member. Strips are reconstructed until there are no further strips to be reconstructed in either $d_i$ or $d_j$, or the next strip that can be reconstructed in the sequence is a strip containing a parity value 30. Once the parity strip is reconstructed, the reconstruction sequence is terminated because the parity strip is a member of exactly one unique parity group. If however, there are strips remaining in $d_i$ and $d_j$ that are yet to be reconstructed 32, another reconstruction sequence is started by locating some data strip $(r, c)_k$ on either $d_i$ or $d_j$ such that none of the other members of one of the parity groups $G_k$ or $G_{k+1}$ (of which the strip $(r, c)_k$ is a member), appear in either $d_i$ or $d_j$, 22, and proceed in the manner described previously. While this describes the procedure for reconstructing data for one set of a set in a disk array, it should be understood that an array may be partitioned into many sets, and the previously described technique would be performed on each of the component sets of the array to completely recover from the loss of two failed disks.

FIG. 4 illustrates an exemplary array logically configured for providing multiple disk failure fault tolerance. As shown, the array includes three rows and six columns. Each row represents a stripe, and each column represents a disk in the array. For simplicity, only one reconstruction set is illustrated as comprising the array. The reconstruction set contains twelve data strips in the top two stripes and six parity strips in the bottom-most stripe of the array. Each data strip belongs to two parity groups and is used for the calculation of the parity corresponding to those two groups as described previously. For example, data strip (1,1) (the data strip located at array position row 1, column 1) having parity membership indicated by $\{1,4\}$, belongs to parity groups $G_1$ and $G_4$. Membership in a first parity group for the data strip (1,1) is calculated according to formula (1) as $(1 \times 1)$ mod $7=1$, and member ship in a second parity group is calculated according to formula (2) as $[(6-1-1) \times 1]$ mod $7=4$.

The corresponding parity values for the parity groups $G_1$ and $G_4$ are stored in strips (3,3) and (3,5) respectively, since the ordinal value of the parity group whose parity is stored at strip (3,3) is calculated according to formula (3) as $[(6-1) \times 3]$ mod $7=1$, and the ordinal value of the parity group whose parity is stored at strip (3,5) is calculated as $[(6-1) \times 5]$ mod $7=4$. Each parity strip contains a parity value that is derived by taking the XOR of four data strips that belong to its corresponding parity group. For example, the parity value stored in the parity strip (3,1) for parity group $G_5$ (represented in FIG. 4 as $\{5\}$) is calculated by taking the XOR of the data strip (1,3), assigned to parity groups $\{3,5\}$; the data strip (2,4), assigned to parity groups $\{1,5\}$; the data strip (1,5), assigned to parity groups $\{5,6\}$; and the data strip (2,6), assigned to parity groups $\{5,4\}$.

Data can be recovered in the array from the failure of any two disks as follows. Assuming, without loss of generality that disk 2 and disk 5, corresponding to columns 2 and 5, have failed. The strips comprising disk 2 and disk 5 can then be reconstructed by sequentially reconstructing the strips constituting the failed disks. If a data strip (r, c) is destroyed, its contents can be reconstructed if the remaining data strips and parity strip of at least one of the parity groups to which strip (r, c) belongs are intact. Accordingly, to start reconstructing a strip on either failed disk, a data strip must be located on either disk 2 or disk 5 that belongs to a parity group that does not have any other member of the parity group located on either destroyed disk.

For example, data strip (1,2) located on disk 2 and assigned to parity groups $\{2,1\}$ can be used as a starting strip. Data strip (1,2) qualifies for this purpose because it belongs to the parity group $G_2$ and no other members of $G_2$ [which includes strip (2,1), assigned to parity groups $\{2,3\}$; strip (2,3), assigned to parity groups $\{6,2\}$; strip (1,4) assigned to parity groups $\{4,2\}$; and strip (3,6) assigned the parity value for the parity group $G_2$, represented as $\{2\}$] occur on either disk 2 or disk 5. These remaining members of $G_2$ must all be intact, and thus, we can reconstruct strip (1,2) using these remaining members of $G_2$. Once strip (1,2) has been reconstructed, any data strip belonging to the parity group $G_1$ can be reconstructed because strip (1,2), assigned to parity groups $\{2,1\}$, is also a member of parity group $G_1$. Since strip (1,2) has been already reconstructed and there can be at most two strips of any parity group assigned to two disks, at most one strip belonging to the parity group $G_1$ remains to be reconstructed.

Next, data strip (2,5), assigned to groups $\{3,1\}$ on disk 5, can be reconstructed because it is a member of the parity group $G_1$. Once strip (2,5) is reconstructed, any data strip belonging to the parity group $G_3$ can be reconstructed because strip (2,5) is also a member of parity group $G_3$, and there can be at most two strips of any parity group in two disks. Therefore, the strip (3,2) assigned the parity value for group $G_3$ (represented as $\{3\}$) can be reconstructed. In a similar manner, the remaining strips on disks 2 and 5 can be reconstructed in the sequence of strips (1,5) assigned parity groups $\{5,6\}$; strip (2,2) assigned parity groups $\{4,6\}$; and strip (3,5) assigned the parity value for group $G_4$ (represented as $\{4\}$); thereby completing the reconstruction of the disks 2 and 5. Accordingly, the improved RAID 6 architecture described above can reduce the dependency length required to reconstruct a desired data strip, for example on a degraded disk, is approximately equal to N/2.

In yet another aspect, the invention includes a method, system and data structure for formatting storage elements in an array of N storage fault-domains, such as N disks in an array, wherein some of the storage elements include stored data and some of the storage elements include information for recovering from a loss of one or more storage elements containing stored data, or recovery data, such as parity values. The storage elements may be arranged in periodic sets of storage elements that provide the capability to recover data when a given number, F, greater than one, of those fault-domains fail. This method of formatting is believed to be unique in that in each periodic set, the method uses only one storage element containing recovery data for a number of storage element containing stored data that is no greater than (N/F)−1. This disclosure further describes several configurations of data and redundancy, some information theoretically optimal and other non-optimal, that meet the above criteria.

For example, storage elements may be data striped across an array of N fault-domains, such as disks, for providing recovery from simultaneous failure of any two of the fault domains. Periodic redundancy, such as parity, is added to data striped across N fault domains. The redundancy is computed such that, if the data of any two fault domains are not accessible, the data can be reconstructed from the data of the remaining N−2 fault domains, together with the redundancy on the other N−2 fault domains. A periodic relationship of the data and redundancy is established, such that for one storage element containing recovery data from each of the N fault-domains, there are no more than (N/2−1) storage elements containing stored data on that fault domain. The set of N×N/2 storage elements containing stored data and storage elements containing recovery (i.e., parity) data from the N fault-domains (the N storage element containing recovery data, one storage element containing recovery data from each of the N fault domains and the related no-more-than N×(N/2 1) storage element containing stored data, i.e., (N/2)1 storage elements containing stored data on each of the N fault domains) constitute a set that can be reconstructed if any two fault domains fail, wherein the reconstruction of the set may be performed without referring to any other stored data or stored recovery data outside of a respective periodic set.

In the past, disk array architectures for recovering data after the failure of two fault domains from an array of N fault domains have used two or more storage elements containing recovery data of redundancy on each fault domain in a periodic set. Advantageously, the innovative method described herein uses only one storage element containing recovery data on each fault domain in a periodic set to provide two fault domains, such as two disks, simultaneous failure fault recovery. A periodic set of an array of N fault-domains may be said to be optimally efficient with respect to minimizing a ratio of storage elements containing stored data to storage elements containing recovery data for the recovery of two fault domains if there is one storage element containing recovery data for every (N/2)−1 storage elements containing stored data. The periodic sets on an array of N fault-domains is optimally efficient with respect to minimizing the ratio of storage elements containing recovery data to storage elements containing stored data if there is one storage element containing recovery data for every N/2 storage element containing recovery data and storage element containing stored data combined on each of the N fault-domains. However, it may be desired in some cases to use a periodic set with fewer storage elements containing stored data per one storage element containing recovery data than the optimal ratio. Using fewer storage elements containing stored data per storage element containing recovery data may improve the efficiency of recovering data when two fault domains have failed. Such a scheme may also improve the efficiency of the encoding implementation. Regardless, having only one storage element containing recovery data for no-more-than (N/2)−1 storage elements containing stored data improves efficiency of recovery of data.

Exemplary embodiments of array recovery architectures for providing multiple simultaneous fault-domain failure fault-tolerance will now be described. Table 1 depicts an exemplary array architecture including four fault domains:

TABLE 1

| | N = 4 | | | |
|---|---|---|---|---|
| | Fault Domains | | | |
| | 1 | 2 | 3 | 4 |
| Data | 2, 3 | 3, 4 | 4, 1 | 1, 2 |
| Redundancy | 1 | 2 | 3 | 4 |

For the array of four fault domains as shown in Table 1 (columns of Table 1) with the fault domains numbered from one to four, one storage element containing stored data and one storage element containing recovery data in each fault domain are shown forming the periodic set of related storage elements containing stored data and storage elements containing recovery data that protect the four fault domains from the loss of data if there were a failure of any two of the four fault domains. The storage element containing stored data contributes to the parity computation of the storage element containing recovery data whose numbers are in the storage element containing stored data position (e.g., the storage element containing stored data in Fault Domain 1 contributes to the parity computation of the storage element containing recovery data of Fault Domains 2 and 3) as shown in Table 1.

Table 2 depicts an exemplary array architecture including six fault domains:

TABLE 2

| | N = 6 | | | | | |
|---|---|---|---|---|---|---|
| | Flt. Dom. | | | | | |
| | 1 | 2 | 3 | 4 | 5 | 6 |
| Data 1 | 5, 6 | 6, 1 | 1, 2 | 2, 3 | 3, 4 | 4, 5 |
| Data 2 | 2, 4 | 3, 5 | 4, 6 | 5, 1 | 6, 2 | 1, 3 |
| Redundancy | 1 | 2 | 3 | 4 | 5 | 6 |

For the array of six fault domains as shown in Table 2 (columns of Table 2) with the fault domains numbered from one to six in Table 2, two storage elements containing stored data and one storage element containing recovery data in each fault domain are shown forming the periodic set of related storage elements containing stored data and storage elements containing recovery data that protect the six fault-domains from the loss of data if there were a failure of any two of the six fault domains. The storage elements containing stored data contribute to the parity computation of the storage element containing recovery data whose numbers are in the storage element containing stored data position (e.g., the first storage element containing stored data in Fault Domain 1 contributes to the parity computation of the storage element containing recovery data of Fault Domains 5 and 6, and the second storage element containing stored data contributes to the parity computation of the storage element containing recovery data of Fault Domains 2 and 4) as shown in Table 2.

Table 3 depicts an exemplary array architecture including eight fault domains:

or numbers, in each column, two for each of the N/2 storage elements containing stored data and one for the storage element containing recovery data. If any number were to appear twice in the same column, it may not be possible to recover all data from every double disk failure. In addition, if any two storage elements containing stored data had the same pair of numbers, it may not be possible to recover all data from every double disk failure as required for example, for a valid RAID 6 code.

Table 4 depicts an exemplary array architecture including twelve fault domains:

TABLE 4

N = 12

| | F.D. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Data1 | 4, 5 | 3, 4 | 6, 7 | 5, 6 | 8, 9 | 7, 8 | 10, 11 | 9, 10 | 12, 1 | 11, 12 | 2, 3 | 1, 2 |
| Data2 | 2, 10 | 5, 12 | 4, 12 | 7, 2 | 6, 2 | 9, 4 | 8, 4 | 11, 6 | 10, 6 | 1, 8 | 12, 8 | 3, 10 |
| Data3 | 3, 11 | 6, 1 | 5, 1 | 8, 3 | 7, 3 | 10, 5 | 9, 5 | 12, 7 | 11, 7 | 2, 9 | 1, 9 | 4, 11 |
| Data4 | 6, 8 | 7, 10 | 8, 10 | 9, 12 | 10, 12 | 11, 2 | 12, 2 | 1, 4 | 2, 4 | 3, 6 | 4, 6 | 5, 8 |
| Data5 | 7, 9 | 8, 11 | 9, 11 | 10, 1 | 11, 1 | 12, 3 | 1, 3 | 2, 5 | 3, 5 | 4, 7 | 5, 7 | 6, 9 |
| Redun. | 1 | 2 | 3 | 4 | 5 | 6 | 7 | 8 | 9 | 10 | 11 | 12 |

TABLE 3

N = 8

| | Fault Domain | | | | | | | |
|---|---|---|---|---|---|---|---|---|
| | 1 | 2 | 3 | 4 | 5 | 6 | 7 | 8 |
| Data 1 | 2, 3 | 4, 5 | 7, 8 | 5, 6 | 6, 7 | 8, 1 | 3, 4 | 1, 2 |
| Data 2 | 4, 6 | 6, 8 | 1, 4 | 7, 2 | 8, 2 | 2, 4 | 5, 8 | 3, 6 |
| Data 3 | 5, 7 | 7, 1 | 2, 5 | 8, 3 | 1, 3 | 3, 5 | 6, 1 | 4, 7 |
| Redundancy | 1 | 2 | 3 | 4 | 5 | 6 | 7 | 8 |

For the array of eight fault domains as shown in Table 3 (columns of Table 3) with the fault domains numbered from one to eight in Table 3, three storage elements containing stored data and one storage element containing recovery data in each fault domain are shown forming the periodic set of related storage elements containing stored data and storage elements containing recovery data that protect the eight fault-domains from the loss of data if there were a failure of any two of the eight fault-domains. The storage elements containing stored data contribute to the parity computation of the storage element containing recovery data whose numbers are in the storage element containing stored data position (e.g., the first storage element containing stored data in Fault Domain 1 contributes to the parity computation of the storage element containing recovery data of Fault Domains 2 and 3, the second storage element containing stored data contributes to the parity computation of the storage element containing recovery data of Fault Domains 4 and 6 and the third storage element containing stored data contributes to the parity computation of the storage element containing recovery data of Fault Domains 5 and 7) as shown in Table 3.

Each storage element containing stored data represented in respective in Tables 1, 2 and 3 includes two numbers, corresponding to two storage elements containing recovery data, such as parity, to which the stored data contributes. In the three Tables, there are N−1 different distinct identifiers, For an array of twelve fault domains shown in Table 4 (columns in Table 4) with the fault domains numbered from one to 12 in Table 4, five storage elements containing stored data and one storage element containing recovery data in each fault domain are shown forming the periodic set of related storage elements containing stored data and storage elements containing recovery data that protect the twelve fault-domains from the loss of data if there were a failure of any two of the twelve fault-domains. The storage elements containing stored data contribute to the parity computation of the storage element containing recovery data whose numbers are in the storage element containing stored data position (e.g., the first storage element containing stored data in Fault Domain 1 contributes to the parity computation of the storage element containing recovery data of Fault Domains 4 and 5, the second storage element containing stored data contributes to the parity computation of the storage element containing recovery data of Fault Domains 2 and 10, the third storage element containing stored data contributes to the parity computation of the storage element containing recovery data of Fault Domains 3 and 11, the fourth storage element containing stored data contributes to the parity computation of the storage element containing recovery data of Fault Domains 6 and 8 and the fifth storage element containing stored data contributes to the parity computation of the storage element containing recovery data of Fault Domains 7 and 9) as shown in Table 4. Other examples of such an optimal redundancy configuration is the configuration described previously wherein N=2K, is an even number such that N+1=P where P is a prime number.

Tables 1–4 show array architectures capable of recovering stored data lost by the failure of any two fault domains. These tables contain (N/2)−1 rows of storage element containing stored data and one row of storage element containing recovery data. The ratio of storage elements containing stored data to storage elements containing recovery data is an optimized ratio (i.e., smallest amount of storage elements containing recovery data per storage element containing stored data) capable of recovering the data lost by the failure of any two fault domains for an array of N fault domains.

It has been experimentally determined that an average recovery time for the exemplary embodiments shown in Tables 1–4 is proportional to (N/2)–1, the number of storage elements containing stored data in a column (i.e., in a periodic set on a fault domain), for recovery of a single storage element containing stored data. Some conventional RAID 6 type architectures use two or more storage elements containing recovery data in a periodic set on each fault domain. The conventional architectures exhibit recovery times proportional to the number of storage elements containing stored data on each fault domain in a periodic set. However, conventional architectures typically include at least N–2 storage elements containing stored data on each fault domain in a periodic set. Accordingly, an average recovery time when two fault domains are lost is at least a factor of two greater than the average recovery time for the exemplary architectures shown in Tables 1–4.

For an array of N fault domains, it is possible to have a non-optimal configuration with fewer storage element containing stored data for one storage element containing recovery data in a periodic set on each fault domain. These also provide the capability of recovering all data when any two fault domains become inaccessible. In most cases, such non-optimal configurations have somewhat simpler implementation characteristics and substantially superior data recovery characteristics. The only sense in which they are non-optimal is that they use a slightly larger percentage of storage space for storage element containing recovery data relative to the space used for storage element containing stored data. Optimal units for large arrays of fault domains may have an average recovery time per storage element containing stored data when two fault domains fail that is larger than would be acceptable to users of the array.

If an array has an odd number of fault domains, optimal configurations may not be possible to achieve with the above architecture. For example, when the size, N, of a disk array is an odd integer, it may not be possible to have an optimal recovery architecture with one row of parity and some number of complete rows of data. In these cases, configurations having one storage element containing recovery data for less than N/2–1 storage element containing stored data may be used. For example, Table 5 through 10 depict an exemplary non-optimal array architectures including five N where N is odd and Table 11 is an exemplary non-optimal array architectures including 14 fault domains. These tables contain less than N/2–1 rows of storage element containing stored data and one row of storage element containing recovery data. This ratio of storage elements containing stored data to storage to storage elements containing recovery data is a non-optimum ratio (i.e., greater than the smallest amount of storage elements containing recovery data to storage elements containing stored data) capable of recovering the data lost by a failure of any two fault domains for an array of N fault domains.

TABLE 5

N = 5

| | Fault Domain | | | | |
|---|---|---|---|---|---|
| | 1 | 2 | 3 | 4 | 5 |
| Data 1 | 2, 5 | 3, 1 | 4, 2 | 5, 3 | 1, 4 |
| Redundancy | 1 | 2 | 3 | 4 | 5 |

For an array of five fault domains as shown in Table 5 (columns in Table 5) with the fault domains numbered from one to five, one storage element containing stored data and one storage element containing recovery data in each fault domain are shown forming the periodic set of related storage elements containing stored data and storage elements containing recovery data that protect the five fault-domains from the loss of data if there were a failure of any two of the five fault domains. The storage element containing stored data contributes to the parity computation of the storage elements containing recovery data whose numbers are in the storage element containing stored data position (e.g., the storage element containing stored data in Fault Domain 1 contributes to the parity computation of the storage element containing recovery data of Fault Domains 2 and 5) as shown in Table 5.

Table 5 shows only one of several configurations of related storage elements containing stored data and storage elements containing recovery data that meet the constraints of the disclosed formats for periodic sets on five fault domains having one storage element containing stored data per storage element containing recovery data. The configurations in the following tables similarly depict only one of many configurations that also are included in the disclosed format of configurations for periodic sets on the number of fault domains shown.

Table 6 depicts an exemplary array architecture including seven fault domains:

TABLE 6

N = 7

| | Fault Domain | | | | | | |
|---|---|---|---|---|---|---|---|
| | 1 | 2 | 3 | 4 | 5 | 6 | 7 |
| Data 1 | 2, 7 | 3, 1 | 4, 2 | 5, 3 | 6, 4 | 7, 5 | 1, 6 |
| Data 2 | 3, 6 | 4, 7 | 5, 1 | 6, 2 | 7, 3 | 1, 4 | 2, 5 |
| Redundancy | 1 | 2 | 3 | 4 | 5 | 6 | 7 |

For an array of seven fault domains as shown in Table 6 (columns in Table 6) with the fault domains numbered from one to seven in Table 6, two storage elements containing stored data and one storage element containing recovery data in each fault domain are shown forming the periodic set of related storage elements containing stored data and storage elements containing recovery data that protect the seven fault-domains from the loss of data if there were a failure of any two of the seven fault domains. The storage element containing stored data contribute to the parity computation of the storage element containing recovery data whose numbers are in the storage element containing stored data position (e.g., the first storage element containing stored data in Fault Domain 1 contributes to the parity computation of the storage element containing recovery data of Fault Domains 2 and 7, and the second storage element containing stored data contributes to the parity computation of the storage element containing recovery data of Fault Domains 2 and 4) as shown in Table 6.

Table 7 depicts an exemplary array architecture including nine fault domains:

TABLE 7

N = 9

| | Fault Domain | | | | | | | | |
|---|---|---|---|---|---|---|---|---|---|
| | 1 | 2 | 3 | 4 | 5 | 6 | 7 | 8 | 9 |
| Data 1 | 3, 2 | 4, 3 | 5, 4 | 6, 5 | 7, 6 | 8, 7 | 9, 8 | 1, 9 | 2, 1 |
| Data 2 | 4, 9 | 5, 1 | 6, 2 | 7, 3 | 8, 4 | 9, 5 | 1, 6 | 2, 7 | 3, 8 |
| Data 3 | 5, 8 | 6, 9 | 7, 1 | 8, 2 | 9, 3 | 1, 4 | 2, 5 | 3, 6 | 4, 7 |
| Redundancy | 1 | 2 | 3 | 4 | 5 | 6 | 7 | 8 | 9 |

For an array of nine fault domains as shown in Table 7 (columns in Table 7) with the fault domains numbered from one to nine in Table 7, three storage elements containing stored data and one storage element containing recovery data in each fault domain are shown forming the periodic set of related storage elements containing stored data and storage elements containing recovery data that protect the nine fault-domains from the loss of data if there were a failure of any two of the nine fault-domains. The storage elements containing stored data contribute to the parity computation of the storage elements containing recovery data whose numbers are in the storage element containing stored data position (e.g., the first storage element containing stored data in Fault Domain 1 contributes to the parity computation of the storage element containing recovery data of Fault Domains 2 and 3, the second storage element containing stored data contributes to the parity computation of the storage element containing recovery data of Fault Domains 4 and 9 and the third storage element containing stored data contributes to the parity computation of the storage element containing recovery data of Fault Domains 5 and 8) as shown in Table 7.

Table 8 depicts an exemplary array architecture including eleven fault domains:

TABLE 8

N = 11

| | F.D. | | | | | | | | | | |
|---|---|---|---|---|---|---|---|---|---|---|---|
| | 1 | 2 | 3 | 4 | 5 | 6 | 7 | 8 | 9 | 10 | 11 |
| Data 1 | 3, 2 | 4, 3 | 5, 4 | 6, 5 | 7, 6 | 8, 7 | 9, 8 | 10, 9 | 11, 10 | 1, 11 | 2, 1 |
| Data 2 | 4, 11 | 5, 1 | 6, 2 | 7, 3 | 8, 4 | 9, 5 | 10, 6 | 11, 7 | 1, 8 | 2, 9 | 3, 10 |
| Data 3 | 5, 10 | 6, 11 | 7, 1 | 8, 2 | 9, 3 | 10, 4 | 11, 5 | 1, 6 | 2, 7 | 3, 8 | 4, 9 |
| Data 4 | 6, 9 | 7, 10 | 8, 11 | 9, 1 | 10, 2 | 11, 3 | 1, 4 | 2, 5 | 3, 6 | 4, 7 | 5, 8 |
| Redun. | 1 | 2 | 3 | 4 | 5 | 6 | 7 | 8 | 9 | 10 | 11 |

For an array of eleven fault domains as shown in Table 8 (columns in Table 8) with the fault domains numbered from one to eleven in Table 8, four storage elements containing stored data and one storage element containing recovery data in each fault domain are shown forming the periodic set of related storage elements containing stored data and storage elements containing recovery data that protect the eleven fault-domains from the loss of data if there were a failure of any two of the eleven fault-domains.

Table 9 depicts an exemplary array architecture including thirteen fault domains:

TABLE 9

N = 13

| | F.D. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| D 1 | 3, 2 | 4, 3 | 5, 4 | 6, 5 | 7, 6 | 8, 7 | 9, 8 | 10, 9 | 11, 10 | 12, 11 | 13, 12 | 1, 13 | 2, 1 |
| D 2 | 4, 13 | 5, 1 | 6, 2 | 7, 3 | 8, 4 | 9, 5 | 10, 6 | 11, 7 | 12, 8 | 13, 9 | 1, 10 | 2, 11 | 3, 12 |
| D 3 | 5, 12 | 6, 13 | 7, 1 | 8, 2 | 9, 3 | 10, 4 | 11, 5 | 12, 6 | 13, 7 | 1, 8 | 2, 9 | 3, 10 | 4, 11 |
| D 4 | 6, 11 | 7, 12 | 8, 13 | 9, 1 | 10, 2 | 11, 3 | 12, 4 | 13, 5 | 1, 6 | 2, 7 | 3, 8 | 4, 9 | 5, 10 |
| D 5 | 7, 10 | 8, 11 | 9, 12 | 10, 13 | 11, 1 | 12, 2 | 13, 3 | 1, 4 | 2, 5 | 3, 6 | 4, 7 | 5, 8 | 6, 9 |
| Red. | 1 | 2 | 3 | 4 | 5 | 6 | 7 | 8 | 9 | 10 | 11 | 12 | 13 |

For an array of thirteen fault domains as shown in Table 9 (columns in Table 9) with the fault domains numbered from one to thirteen in Table 9, five storage elements containing stored data and one storage element containing recovery data in each fault domain are shown forming the periodic set of related storage elements containing stored data and storage elements containing recovery data that protect the thirteen fault-domains from the loss of data if there were a failure of any two of the thirteen fault-domains.

Table 10 depicts an exemplary array architecture including 15 fault domains:

TABLE 10

N = 15

| | F.D. | | | | | | | |
|---|---|---|---|---|---|---|---|---|
| | 1 | 2 | 3 | 4 | 5 | 6 | 7 | 8 |
| D1 | 8, 10 | 15, 3 | 7, 13 | 13, 8 | 6, 15 | 14, 9 | 5, 2 | 13, 12 |
| D2 | 15, 2 | 14, 5 | 14, 6 | 11, 10 | 12, 10 | 11, 12 | 10, 14 | 9, 15 |
| D3 | 7, 11 | 13, 6 | 4, 15 | 9, 12 | 1, 4 | 5, 1 | 3, 4 | 5, 3 |
| D4 | 6, 12 | 12, 7 | 11, 9 | 7, 14 | 13, 9 | 2, 4 | 8, 15 | 1, 7 |
| D5 | 14, 4 | 11, 8 | 1, 2 | 5, 15 | 2, 3 | 15, 7 | 13, 11 | 14, 11 |
| D6 | 5, 13 | 10, 9 | 8, 12 | 3, 1 | 8, 14 | 13, 10 | 1, 6 | 6, 2 |
| Red. | 1 | 2 | 3 | 4 | 5 | 6 | 7 | 8 |

| | F.D. | | | | | | |
|---|---|---|---|---|---|---|---|
| | 9 | 10 | 11 | 12 | 13 | 14 | 15 |
| D1 | 4, 5 | 7, 3 | 3, 8 | 11, 1 | 2, 11 | 10, 4 | 9, 7 |
| D2 | 8, 1 | 2, 8 | 6, 5 | 5, 7 | 4, 9 | 3, 11 | 10, 6 |
| D3 | 12, 14 | 14, 13 | 9, 2 | 15, 13 | 6, 7 | 13, 1 | 2, 14 |
| D4 | 15, 10 | 9, 1 | 12, 15 | 10, 2 | 8, 5 | 6, 8 | 11, 5 |
| D5 | 3, 6 | 4, 6 | 1, 10 | 4, 8 | 10, 3 | 9, 5 | 3, 13 |
| D6 | 7, 2 | 15, 11 | 4, 7 | 9, 3 | 12, 1 | 2, 12 | 12, 4 |
| Red. | 9 | 10 | 11 | 12 | 13 | 14 | 15 |

For an array of fifteen fault domains as shown in Table 10 (columns in Table 10) with the fault domains numbered from one to fifteen in Table 10, six storage elements containing stored data and one storage element containing recovery data in each fault domain are shown forming the periodic set of related storage elements containing stored data and storage elements containing recovery data that protect the fifteen fault-domains from the loss of data if there were a failure of any two of the fifteen fault-domains.

Non-optimal configurations may also be used on arrays of N fault domains with N being an even number. Such configurations may have better average data recovery times when two of the fault domains have failed than an optimal configuration. Table 11 below shows such a configuration for an array of fourteen fault domains.

TABLE 11

N = 14

| | Flt. Dom. | | | | | | |
|---|---|---|---|---|---|---|---|
| | 1 | 2 | 3 | 4 | 5 | 6 | 7 |
| Data 1 | 7, 6 | 8, 7 | 9, 8 | 10, 9 | 11, 10 | 12, 11 | 13, 12 |
| Data 2 | 8, 5 | 9, 6 | 10, 7 | 11, 8 | 12, 9 | 13, 10 | 14, 11 |
| Data 3 | 9, 4 | 10, 5 | 11, 6 | 12, 7 | 13, 8 | 14, 9 | 1, 10 |
| Data 4 | 3, 13 | 4, 14 | 5, 1 | 6, 2 | 7, 3 | 8, 4 | 9, 5 |
| Data 5 | 2, 14 | 3, 1 | 4, 2 | 5, 3 | 6, 4 | 7, 5 | 8, 6 |
| Redund | 1 | 2 | 3 | 4 | 5 | 6 | 7 |

| | Flt. Dom. | | | | | | |
|---|---|---|---|---|---|---|---|
| | 8 | 9 | 10 | 11 | 12 | 13 | 14 |
| Data 1 | 14, 13 | 1, 14 | 2, 1 | 3, 2 | 4, 3 | 5, 4 | 6, 5 |
| Data 2 | 1, 12 | 2, 13 | 3, 14 | 4, 1 | 5, 2 | 6, 3 | 7, 4 |
| Data 3 | 2, 11 | 3, 12 | 4, 13 | 5, 14 | 6, 1 | 7, 2 | 8, 3 |

TABLE 11-continued

| | | | N = 14 | | | | |
|---|---|---|---|---|---|---|---|
| Data 4 | 10, 6 | 11, 7 | 12, 8 | 13, 9 | 14, 10 | 1, 11 | 2, 12 |
| Data 5 | 9, 7 | 10, 8 | 11, 9 | 12, 10 | 13, 11 | 14, 12 | 1, 13 |
| Redund | 8 | 9 | 10 | 11 | 12 | 13 | 14 |

The configuration uses five storage elements containing stored data for each storage element containing recovery data on each fault domain. In the configuration shown in Table 11, the column of numbers under each fault domain includes eleven numbers including the redundancy number. Three of the fourteen numbers from 1 to 14 are missing from each fault domain. As in the case of the optimal configurations described above, these are important in determining that the configuration has the capability to recover all data when two of the fault domains fail.

In each of the Tables 1–11, the two fault recovery architecture may be defined by a data structure, such as a parity table, for recovering data in the array. For example, the data structure may include an N-column by R-row mapping table, each mapping table entry mapped to a corresponding storage element containing stored data in the architecture and organized into mapping table columns and mapping table rows. Each mapping table entry mapped to a corresponding storage element containing stored data includes two parity group identifiers, each group identifier indicative of the respective two different parity groups to which the data value has been assigned. Each mapping table entry mapped to a corresponding storage element containing recovery data includes a parity value identifier, each parity value identifier indicative of the respective party group to which the parity value belongs.

For odd values of N, an optimum recovery architecture will have (N+1)/2 rows with one complete row of storage elements containing recovery data (N elements) and (N−3)/2 complete rows of storage elements containing stored data and one row with N−1 storage elements containing stored data and one storage element containing recovery data. For example, if two fault domains, such as disks, fail (i.e., two columns are erased), there are two cases to consider. If neither of the two columns are the one that contained two storage elements containing recovery data, then the two columns each contained (N−1)/2 storage elements containing stored data for a total of (N−1) storage element containing stored data. All but one of the remaining (N−2) columns each have one storage element containing recovery data and the other has two storage elements containing recovery data for a total of (N−1) storage elements containing recovery data. This is the minimum needed to reconstruct the storage element containing stored data.

Similarly, if one of the two erased columns is the one that contained two storage elements containing recovery data, then one of the two columns contains (N−1)/2 storage elements containing stored data and the other contains (N−3)/2 storage element containing stored data for a total of (N−2) storage element containing stored data. In this case, all of the remaining (N−2) columns each have one storage element containing recovery data for a total of (N−2) parity units. Again this is the minimum needed to reconstruct the storage element containing stored data.

If a data structure for a two fault recovery architecture has N columns with one row of table entries containing parity value identifiers and (R−1) rows of N table entries containing paired group identifiers with R less than or equal to N/2, or the data structure has N columns with one row of table entries containing parity value identifiers, one row with N−1 table entries containing paired group identifiers and one table entries entry containing a parity value identifier and R−2 rows of table entries containing paired group identifiers with R less than or equal to N/2, then the data structure describes a RAID 6 code if and only if it satisfies the following property:

Property A:

Each column includes N−M distinct identifying numbers (including the parity value identifier number, that is, two for each of the R paired group identifiers and one for the parity value identifier (s)) with no number appearing more than once. Let the numbers that do not appear in the $i^{th}$ column be denoted by $x_m(i)$ for m=1,2, . . . , M. For any value, n, in a table entry containing paired group identifiers of column i, let $n_i$ be the other number paired with n in that table entry containing paired group identifiers of column i. Given any two columns i and k, using each of the values $x_m(i)$ and $x_m(k)$, a set of values $i_{m,1}, i_{m,2}, i_{m,3}, \ldots$ and $k_{m,1}, k_{m,2}, k_{m,3}, \ldots$ may be constructed such that $i_{m,1}=x_m(i)$, $i_{m,2}=(i_{m,1})_k$, $i_{m,3}=(i_{m,2})_i$, $i_{m,4}=(i_{m,3})_k \ldots$ and $k_{m,1}=x_m(k)$, $k_{m,2}=(k_{m,1})_i$, $k_{m,3}=(k_{m,2})_k$, $k_{m,4}=(k_{m,3})_i, \ldots$ ending when one of the values of $i_j$ and one of the values of $k_j$ has no corresponding paired mate in any of the table entry containing paired group identifiers in its column (i.e., it is equal to either i or k), or has no corresponding value in the other column (i.e., is equal to one of the values $x_m(i)$ or $x_m(k)$). The data structure satisfies the above described property if and only if, for any two columns i and k, the combined set of numbers, $i_{m,j}$ and $k_{m,j}$, consist of all of the numbers from 1 to N.

Tables 5 through 11 describe redundancy configurations capable of recovering the data lost by the failure of any two fault domains because the above Property A is satisfied.

For a non-optimal configuration, each table entry containing paired group identifiers in column i and column k will have its pair of numbers appearing as either a pair $(i_{m,j}, i_{(m,j+1)})$ or $(k_{m,j}, k_{(m,j+1)})$ in the one of the above sequences. For each table entry containing paired group identifiers, the number, j, indicates the number of table entries containing paired group identifiers that must be recovered in order to recover the corresponding storage element containing stored data. Because the table entries containing paired group identifiers are spread over 2M sequences, the average recovery time for a storage element containing stored data is proportional to N/2M−1 (the number of storage elements containing stored data in a column in a periodic set on a fault domain divided by M) single unit recovery times. Notice that these non-optimal configurations have average recovery times for storage elements containing stored data when two fault domains have failed that is M times faster than the optimal configurations. For very large array of fault domains, M can be chosen to be quite large without substantially increasing the percentage of redundancy per storage element containing stored data.

Conventional non-optimal approaches to redundancy architectures for double fault domain recovery have two or more storage element containing recovery data in a periodic set on each fault domain. The conventional approaches also have recovery times proportional to the number of storage element containing stored data on each fault domain in a periodic set. However, the conventional approaches all have at least twice as many storage elements containing stored data on each fault domain in a periodic set. The average recovery time using conventional techniques when two fault domains are lost is at least a factor of two greater than the present innovative technique.

When the size, N, of a disk array is an odd integer, it is not possible to have an optimal parity table with one row of parity and some number of complete rows of data. For odd values of N, the optimum parity table will have (N+1)/2 rows with one complete row of parity (N units) and (N−3)/2 complete rows of data and one row with N−1 data units and one parity unit. To see that this is information theoretically optimum, consider the following. If two disks fail (i.e., two columns are erased), there are two cases to consider. If neither of the two columns are the one that contained two parity units, then the two columns each contained (N−1)/2 data units for a total of (N−1) data units. All but one of the remaining (N−2) columns each have one parity unit and the other has two parity units for a total of (N−1) parity units. That is exactly the minimum needed to reconstruct the data units. Similarly, if one of the two erased columns is the one that contained two parity units, then one of the two columns contains (N−1)/2 data units and the other contains (N−3)/2 data units for a total of (N−2) data units. In this case all of the remaining (N−2) columns each have one parity unit for a total of (N−2) parity units. Again that is exactly the minimum needed to reconstruct the data units. The following is an example of a parity table for the odd integer N=7.

TABLE 12

N = 7

| Disk 0 | Disk 1 | Disk 2 | Disk 3 | Disk 4 | Disk 5 | Disk 6 |
|---|---|---|---|---|---|---|
| Parity 0 | Parity 1 | Parity 2 | Parity 3 | Parity 4 | Parity 5 | Parity 6 |
| Parity 7 | (2, 3) | (3, 4) | (4, 6) | (5, 6) | (4, 1) | (7, 1) |
| (1, 2) | (5, 0) | (6, 0) | (7, 2) | (1, 3) | (2, 6) | (3, 5) |
| (6, 3) | (7, 4) | (7, 5) | (1, 5) | (0, 2) | (0, 3) | (4, 0) |

In another aspect of the invention, an optimum parity table for any odd integer, N, can be derived from an optimum parity table for the next higher even integer, N+1 as follows. Given an N+1 optimum parity table, for each column, consider the pair, (P,X), where P is the number of the parity unit in that column and X is the number that does not appear as a parity sequence number for any data unit in that column. For some (arbitrary) column P, there will be another column, Q, for which one of the data units is shown to contribute to the parity sequences P and X (i.e., it has (P,X) or (X,P) as its pair in the parity table). To get an optimum parity table for N from the parity table for N+1, replace the data unit that would contribute to (P,X) or (X,P) by the parity unit, P and discard the column P. The N+1 numbers used in the parity table may be permuted to make the parity numbers on the parity row be the numbers 0, 1 . . . N−1, and with N being the number of a second parity unit in the N−$1^{st}$ column. The result will be an optimum parity table for an array of N disks.

Exemplary data structures corresponding to an array of N disks and comprising mapping table entries for a redundancy set of N fault domains and R rows including a parity value identifier indicative of a each parity value calculated for a parity group and entries including a pair of parity group identifiers indicative of the parity groups to which the each stored data element has been assigned as are shown in Tables 13 through 26:

TABLE 13

N = 3

| Disk 0 | Disk 1 | Disk 2 |
|---|---|---|
| Parity 0 | Parity 1 | Parity 2 |
| Parity 3 | (2, 3) | (0, 1) |

TABLE 14

N = 4

| Disk 0 | Disk 1 | Disk 2 | Disk 3 |
|---|---|---|---|
| Parity 0 | Parity 1 | Parity 2 | Parity 3 |
| 1, 2 | 2, 3 | 3, 0 | 0, 1 |

TABLE 15

N = 5

| Disk 0 | Disk 1 | Disk 2 | Disk 3 | Disk 4 |
|---|---|---|---|---|
| Parity 0 | Parity 1 | Parity 2 | Parity 3 | Parity 4 |
| Parity 5 | (3, 2) | (3, 5) | (4, 1) | (1, 0) |
| (2, 1) | (5, 4) | (0, 4) | (2, 0) | (2, 5) |

TABLE 16

N = 6

| Disk 0 | Disk 1 | Disk 2 | Disk 3 | Disk 4 | Disk 5 |
|---|---|---|---|---|---|
| Parity 0 | Parity 1 | Parity 2 | Parity 3 | Parity 4 | Parity 5 |
| 4, 5 | 5, 0 | 0, 1 | 1, 2 | 2, 3 | 3, 4 |
| 1, 3 | 2, 4 | 3, 5 | 4, 0 | 5, 1 | 0, 2 |

TABLE 17

N = 7

| Disk 0 | Disk 1 | Disk 2 | Disk 3 | Disk 4 | Disk 5 | Disk 6 |
|---|---|---|---|---|---|---|
| Parity 0 | Parity 1 | Parity 2 | Parity 3 | Parity 4 | Parity 5 | Parity 6 |
| Parity 7 | (2, 3) | (3, 4) | (4, 6) | (5, 6) | (4, 1) | (7, 1) |
| (1, 2) | (5, 0) | (6, 0) | (7, 2) | (1, 3) | (2, 6) | (3, 5) |
| (6, 3) | (7, 4) | (7, 5) | (1, 5) | (0, 2) | (0, 3) | (4, 0) |

TABLE 18

N = 8

| Disk 0 | Disk 1 | Disk 2 | Disk 3 | Disk 4 | Disk 5 | Disk 6 | Disk 7 |
|---|---|---|---|---|---|---|---|
| Parity 0 | Parity 1 | Parity 2 | Parity 3 | Parity 4 | Parity 5 | Parity 6 | Parity 7 |
| 1, 2 | 2, 3 | 4, 5 | 7, 0 | 5, 6 | 6, 7 | 0, 1 | 3, 4 |
| 3, 6 | 4, 6 | 6, 0 | 1, 4 | 7, 2 | 0, 2 | 2, 4 | 5, 0 |
| 4, 7 | 5, 7 | 7, 1 | 2, 5 | 0, 3 | 1, 3 | 3, 5 | 6, 1 |

TABLE 19

N = 9

| | \multicolumn{9}{c}{Disk} |
| | 0 | 1 | 2 | 3 | 4 | 5 | 6 | 7 | 8 |
|---|---|---|---|---|---|---|---|---|---|
| Parity | P0 | P1 | P2 | P3 | P4 | P5 | P6 | P7 | P8 |
| D1 | 6, 4 | 5, 7 | 0, 3 | 4, 0 | 9, 6 | 3, 2 | 8, 9 | 2, 5 | P9 |
| D2 | 1, 9 | 0, 2 | 9, 4 | 8, 6 | 7, 8 | 6, 0 | 5, 1 | 4, 3 | 7, 1 |
| D3 | 7, 3 | 4, 8 | 8, 5 | 1, 2 | 5, 0 | 9, 7 | 2, 4 | 6, 1 | 3, 5 |
| D4 | 2, 8 | 9, 3 | 7, 6 | 5, 9 | 3, 1 | 1, 4 | 0, 7 | 8, 0 | 6, 2 |

TABLE 20

N = 10

| | | | | | Disk | | | | | |
|---|---|---|---|---|---|---|---|---|---|---|
| | 0 | 1 | 2 | 3 | 4 | 5 | 6 | 7 | 8 | 9 |
| Parity | P0 | P1 | P2 | P3 | P4 | P5 | P6 | P7 | P8 | P9 |
| D1 | 6, 4 | 5, 7 | 0, 3 | 4, 0 | 9, 6 | 3, 2 | 8, 9 | 2, 5 | 7, 1 | 1, 8 |
| D2 | 1, 9 | 0, 2 | 9, 4 | 8, 6 | 7, 8 | 6, 0 | 5, 1 | 4, 3 | 3, 5 | 2, 7 |
| D3 | 7, 3 | 4, 8 | 8, 5 | 1, 2 | 5, 0 | 9, 7 | 2, 4 | 6, 1 | 0, 9 | 3, 6 |
| D4 | 2, 8 | 9, 3 | 7, 6 | 5, 9 | 3, 1 | 1, 4 | 0, 7 | 8, 0 | 6, 2 | 4, 5 |

TABLE 21

N = 11

| | | | | | | Disk | | | | | | |
|---|---|---|---|---|---|---|---|---|---|---|---|
| | 0 | 1 | 2 | 3 | 4 | 5 | 6 | 7 | 8 | 9 | 10 |
| Par. | P0 | P1 | P2 | P3 | P4 | P5 | P6 | P7 | P8 | P9 | P10 |
| D1 | 7, 5 | 6, 8 | 0, 3 | 5, 11 | 11, 6 | 4, 1 | 10, 9 | 3, 4 | 9, 0 | 2, 7 | P11 |
| D2 | 1, 11 | 0, 2 | 11, 4 | 10, 6 | 9, 8 | 8, 10 | 7, 0 | 6, 1 | 5, 3 | 4, 5 | 8, 2 |
| D3 | 8, 4 | 5, 9 | 10, 5 | 2, 1 | 7, 10 | 0, 6 | 4, 2 | 9, 11 | 1, 7 | 6, 3 | 3, 7 |
| D4 | 2, 10 | 11, 3 | 9, 6 | 7, 9 | 5, 0 | 3, 2 | 1, 5 | 0, 8 | 10, 11 | 8, 1 | 6, 4 |
| D5 | 9, 3 | 4, 10 | 8, 7 | 0, 4 | 3, 1 | 7, 11 | 11, 8 | 2, 5 | 6, 2 | 10, 0 | 1, 9 |

TABLE 22

N = 12

| | | | | | | | Disk | | | | | | |
|---|---|---|---|---|---|---|---|---|---|---|---|---|
| | 0 | 1 | 2 | 3 | 4 | 5 | 6 | 7 | 8 | 9 | 10 | 11 |
| Par. | P0 | P1 | P2 | P3 | P4 | P5 | P6 | P7 | P8 | P9 | P10 | P11 |
| D1 | 7, 5 | 6, 8 | 0, 3 | 5, 11 | 11, 6 | 4, 1 | 10, 9 | 3, 4 | 9, 0 | 2, 7 | 8, 2 | 1, 10 |
| D2 | 1, 11 | 0, 2 | 11, 4 | 10, 6 | 9, 8 | 8, 10 | 7, 0 | 6, 1 | 5, 3 | 4, 5 | 3, 7 | 2, 9 |
| D3 | 8, 4 | 5, 9 | 10, 5 | 2, 1 | 7, 10 | 0, 6 | 4, 2 | 9, 11 | 1, 7 | 6, 3 | 11, 0 | 3, 8 |

TABLE 22-continued

N = 12

| | Disk | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| D4 | 2, 10 | 11, 3 | 9, 6 | 7, 9 | 5, 0 | 3, 2 | 1, 5 | 0, 8 | 10, 11 | 8, 1 | 6, 4 | 4, 7 |
| D5 | 9, 3 | 4, 10 | 8, 7 | 0, 4 | 3, 1 | 7, 11 | 11, 8 | 2, 5 | 6, 2 | 10, 0 | 1, 9 | 5, 6 |

TABLE 23

N = 15

| D0 | D1 | D2 | D3 | D4 | D5 | D6 | D7 |
|---|---|---|---|---|---|---|---|
| P0 | P1 | P2 | P3 | P4 | P5 | P6 | P7 |
| 9, 7 | 8, 10 | 0, 3 | 7, 13 | 15, 6 | 6, 0 | 14, 9 | 5, 2 |
| 1, 15 | 0, 2 | 15, 4 | 14, 6 | 13, 8 | 12, 10 | 11, 12 | 10, 14 |
| 10, 6 | 7, 11 | 14, 5 | 4, 0 | 11, 10 | 1, 4 | 8, 15 | 15, 9 |
| 2, 14 | 15, 3 | 13, 6 | 11, 9 | 9, 12 | 7, 15 | 5, 1 | 3, 4 |
| 11, 5 | 6, 12 | 12, 7 | 1, 2 | 7, 14 | 13, 9 | 2, 4 | 8, 0 |
| 3, 13 | 14, 4 | 11, 8 | 8, 12 | 5, 0 | 2, 3 | 0, 7 | 13, 11 |
| 12, 4 | 5, 13 | 10, 9 | 15, 5 | 3, 1 | 8, 14 | 13, 10 | 1, 6 |

| D8 | D9 | D10 | D11 | D12 | D13 | D14 |
|---|---|---|---|---|---|---|
| P8 | P9 | P10 | P11 | P12 | P13 | P14 |
| 13, 12 | 4, 5 | 12, 15 | 3, 8 | 11, 1 | 2, 11 | P15 |
| 9, 0 | 8, 1 | 7, 3 | 6, 5 | 5, 7 | 4, 9 | 10, 4 |
| 5, 3 | 12, 14 | 2, 8 | 9, 2 | 0, 13 | 6, 7 | 3, 11 |
| 1, 7 | 0, 10 | 14, 13 | 12, 0 | 10, 2 | 8, 5 | 13, 1 |
| 14, 11 | 3, 6 | 9, 1 | 15, 13 | 4, 8 | 10, 3 | 6, 8 |
| 10, 15 | 7, 2 | 4, 6 | 1, 10 | 15, 14 | 12, 1 | 9, 5 |
| 6, 2 | 11, 15 | 0, 11 | 4, 7 | 9, 3 | 14, 0 | 2, 12 |

TABLE 24

N = 16

| D0 | D1 | D2 | D3 | D4 | D5 | D6 | D7 |
|---|---|---|---|---|---|---|---|
| P0 | P1 | P2 | P3 | P4 | P5 | P6 | P7 |
| 9, 7 | 8, 10 | 0, 3 | 7, 13 | 15, 6 | 6, 0 | 14, 9 | 5, 2 |
| 1, 15 | 0, 2 | 15, 4 | 14, 6 | 13, 8 | 12, 10 | 11, 12 | 10, 14 |
| 10, 6 | 7, 11 | 14, 5 | 4, 0 | 11, 10 | 1, 4 | 8, 15 | 15, 9 |
| 2, 14 | 15, 3 | 13, 6 | 11, 9 | 9, 12 | 7, 15 | 5, 1 | 3, 4 |
| 11, 5 | 6, 12 | 12, 7 | 1, 2 | 7, 14 | 13, 9 | 2, 4 | 8, 0 |
| 3, 13 | 14, 4 | 11, 8 | 8, 12 | 5, 0 | 2, 3 | 0, 7 | 13, 11 |
| 12, 4 | 5, 13 | 10, 9 | 15, 5 | 3, 1 | 8, 14 | 13, 10 | 1, 6 |

| D8 | D9 | D10 | D11 | D12 | D13 | D14 | D15 |
|---|---|---|---|---|---|---|---|
| P8 | P9 | P10 | P11 | P12 | P13 | P14 | P15 |
| 13, 12 | 4, 5 | 12, 15 | 3, 8 | 11, 1 | 2, 11 | 10, 4 | 1, 14 |
| 9, 0 | 8, 1 | 7, 3 | 6, 5 | 5, 7 | 4, 9 | 3, 11 | 2, 13 |
| 5, 3 | 12, 14 | 2, 8 | 9, 2 | 0, 13 | 6, 7 | 13, 1 | 3, 12 |
| 1, 7 | 0, 10 | 14, 13 | 12, 0 | 10, 2 | 8, 5 | 6, 8 | 4, 11 |
| 14, 11 | 3, 6 | 9, 1 | 15, 13 | 4, 8 | 10, 3 | 0, 15 | 5, 10 |
| 10, 15 | 7, 2 | 4, 6 | 1, 10 | 15, 14 | 12, 1 | 9, 5 | 6, 9 |
| 6, 2 | 11, 15 | 0, 11 | 4, 7 | 9, 3 | 14, 0 | 2, 12 | 7, 8 |

TABLE 25

N = 14

| P | 0 | 1 | 2 | 3 | 4 | 5 | 6 |
|---|---|---|---|---|---|---|---|
| D1 | 6, 5 | 7, 6 | 8, 7 | 9, 8 | 10, 9 | 11, 10 | 12, 11 |
| D2 | 7, 4 | 8, 5 | 9, 6 | 10, 7 | 11, 8 | 12, 9 | 13, 10 |
| D3 | 8, 3 | 9, 4 | 10, 5 | 11, 6 | 12, 7 | 13, 8 | 0, 9 |

TABLE 25-continued

N = 14

| D4 | 2, 12 | 3, 13 | 4, 0 | 5, 1 | 6, 2 | 7, 3 | 8, 4 |
|---|---|---|---|---|---|---|---|
| D5 | 1, 13 | 2, 0 | 3, 1 | 4, 2 | 5, 3 | 6, 4 | 7, 5 |

| P | 7 | 8 | 9 | 10 | 11 | 12 | 13 |
|---|---|---|---|---|---|---|---|
| D1 | 13, 12 | 0, 13 | 1, 0 | 2, 1 | 3, 2 | 4, 3 | 5, 4 |
| D2 | 0, 11 | 1, 12 | 2, 13 | 3, 0 | 4, 1 | 5, 2 | 6, 3 |
| D3 | 1, 10 | 2, 11 | 3, 12 | 4, 13 | 5, 0 | 6, 1 | 7, 2 |
| D4 | 9, 5 | 10, 6 | 11, 7 | 12, 8 | 13, 9 | 0, 10 | 1, 11 |
| D5 | 8, 6 | 9, 7 | 10, 8 | 11, 9 | 12, 10 | 13, 11 | 0, 12 |

TABLE 26

N = 13

| P | 0 | 1 | 2 | 3 | 4 | 5 | 6 |
|---|---|---|---|---|---|---|---|
| D1 | 2, 1 | 3, 2 | 4, 3 | 5, 4 | 6, 5 | 7, 6 | 8, 7 |
| D2 | 3, 12 | 4, 0 | 5, 1 | 6, 2 | 7, 3 | 8, 4 | 9, 5 |
| D3 | 4, 11 | 5, 12 | 6, 0 | 7, 1 | 8, 2 | 9, 3 | 10, 4 |
| D4 | 5, 10 | 6, 11 | 7, 12 | 8, 0 | 9, 1 | 10, 2 | 11, 3 |
| D5 | 6, 9 | 7, 10 | 8, 11 | 9, 12 | 10, 0 | 11, 1 | 12, 2 |

| P | 7 | 8 | 9 | 10 | 11 | 12 |
|---|---|---|---|---|---|---|
| D1 | 9, 8 | 10, 9 | 11, 10 | 12, 11 | 0, 12 | 1, 0 |
| D2 | 10, 6 | 11, 7 | 12, 8 | 0, 9 | 1, 10 | 2, 11 |
| D3 | 11, 5 | 12, 6 | 0, 7 | 1, 8 | 2, 9 | 3, 10 |
| D4 | 12, 4 | 0, 5 | 1, 6 | 2, 7 | 3, 8 | 4, 9 |
| D5 | 0, 3 | 1, 4 | 2, 5 | 3, 6 | 4, 7 | 5, 8 |

In another aspect of invention, fault domain recovery architectures may be developed using the innovative techniques described above, that will enable all data to be recovered when F fault domains fail using one storage element containing recovery data for less than or equal to N/F−1 storage element containing stored data on each fault domain. For example, for seven fault domains, the configuration shown in Table 27 will enable the recovery of all data when any three fault domains fail:

TABLE 27

F = 3 and N = 7

| | Fault Domain | | | | | | |
|---|---|---|---|---|---|---|---|
| | 1 | 2 | 3 | 4 | 5 | 6 | 7 |
| Data 1 | 2, 3, 4 | 3, 4, 5 | 4, 5, 6 | 5, 6, 7 | 6, 7, 1 | 7, 1, 2 | 1, 2, 3 |
| Redundancy | 1 | 2 | 3 | 4 | 5 | 6 | 7 |

Table 27 depicts a non-optimal configuration. An optimal configuration would have only six fault domains. However it can be shown that no configuration exists for six fault domains with one storage element containing recovery data for each storage element containing stored data that will provide the desired data recovery capability. A configuration, such as a data structure, or parity table, consists of an N-column by R-row mapping table, each mapping table entry being mapped to a corresponding storage element containing a stored data value or recovery data in the architecture and organized into mapping table columns and mapping table rows. Each mapping table entry mapped to a corresponding storage element that contains stored data includes F parity group identifiers, each group identifier indicative of the respective F different parity groups to which the data value has been assigned. Each mapping table entry mapped to a corresponding storage element that contains recovery data includes a parity value identifier, each parity value identifier indicative of the respective party group to which the parity value belongs. The data structure described above will be capable of providing a data recovery capability for all data in an array of N fault domains when F fault domains fail if and only if it satisfies the following generalized property:

Property B:

Each column has N–M distinct numbers, including the parity value identifier number (i.e., F numbers for each table entry containing a set of F group identifiers and one for the each table entry containing a parity value) with no number appearing more than once. Given any set of F columns, $C_1, C_2, \ldots C_F$, let the numbers that appear in none of the columns be denoted as $x_{0,m}$ for $m=1,2, \ldots, K_0$, and let the numbers that appear only in one of the columns (if any) be denoted by $x_{1,m}$ for $m=1,2, \ldots, K_1$. For each value of $x_{1,m}$, let $S(x_{1,m}) = \{x_{1,m}, n_{i,1}, n_{i,2}, \ldots, n_{i,F-1}\}$ be the set of numbers in the table entry containing a F group identifiers containing $x_{1,m}$. Let $x_{2,m}$, for $m=1,2, \ldots, K_2$, be the numbers that appear once in the columns, $C_1, C_2, \ldots C_F$, outside of the union of the sets $S(x_{1,m})$, for $m=1,2, \ldots, K_1$. Let $x_{j,m}$, for $m=1,2, \ldots, K_j$, be the numbers that appear once in the columns, $C_1, C_2, \ldots C_F$, outside of the union of the sets $S(x_{i,m})$, for $m=1,2, \ldots, K_1$ and $i<j$ until $K_j=0$, that is until there are no such numbers, $x_{j,m}$. When $K_j=0$, the union of the sets $S(x_{i,m})$, for $m=1,2, \ldots, K_1$ and $i<j$, consists of all of the numbers from 1 to N.

Tables describing a redundancy configuration will be capable of recovering the data lost by the failure of any F fault domains if and only if the above Property B is satisfied. Each table entry containing a set of F group identifiers in the F columns will have its set of F numbers appearing for the first time in one of the union of the sets $S(x_{i,m})$, for $m=1, 2, \ldots, K_1$ and $i<j$ in the above sequences. For each storage element containing table entry containing a set of F group identifiers, the number, j, indicates the number of storage elements containing stored data that must be recovered in order to recover a particular storage element containing stored data.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard disks, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. In an N-column by R-row logical representation of a set of stored elements in an array of independent disks, N being an odd number and R minus 1 being less than N divided by a number of disk failures F from which the array is to be recovered, the stored elements in the set to be recovered being organized into a plurality of stripes, each stripe comprising a plurality of strips, all strips of a column located on the same disk, a first portion of the strips containing stored data and a second portion of the strips containing parity values, and one and only one strip containing a parity value stored per column per set, except that at least two parity values are stored in at least one of a plurality of N-columns, a method of providing multiple disk fault tolerance comprising:

assigning each strip containing stored data to at least F different parity groups, F being greater than 2, so that each strip containing stored data in a respective column is assigned to parity groups different than other strips containing stored data in the same column;

calculating, for each parity group, a parity value corresponding to all of the strips assigned to the parity group; and storing each of the parity values in strips of different columns so that none of the strips containing stored data in a column are assigned to a parity group whose parity value is stored in a strip of that column;

wherein storing each of the parity values further comprises:

reserving at least one parity row for storing a first portion of the parity values;

reserving at least one strip in a row different from the at least one parity row for storing a second portion of the parity values;

storing each of the parity values of the first portion in respective strips of the at least one reserved parity row; and storing each of the parity values of the second portion in respective reserved strips in the row different from the at least one parity row.

2. The method of claim 1, wherein calculating the parity values for each parity set comprises computing the exclusive-or (XOR) of the information in each stored data strip assigned to the respective parity group.

3. The method of claim 1, wherein N−2 stored data strips are assigned to each parity group.

4. The method of claim 1, wherein each stored element comprises one or more bits of information.

5. The method of claim 1, further comprising, in the case of a simultaneous F disk failure, recovering data from the failed disks, comprising the steps of:

a. locating a first strip containing stored data on a first one of the failed disks so that none of the remaining strips containing stored data contributing to at least one of the parity groups of which the first data strip is a member of are located on the first one of the failed disks;

b. reconstructing the first strip containing stored data on the first one of the failed disks based on an XOR operation of the other members of the parity group of which the first strip containing stored data is a member and the parity value for the group;

c. locating a next strip containing stored data on the another failed disk, the next strip containing stored data being a member of a different parity group of which the previously reconstructed strip containing stored data is a member and of which parity group no other strip on any of the other (F−2) failed disks is a member;

d. reconstructing the next strip containing stored data based on an XOR operation of members of the different parity group and the parity for the different group;

e. sequentially locating and reconstructing remaining strips according to steps c–d until no further data strips can be recreated or a parity strip on a failed disk is reconstructed; and f. sequentially locating and reconstructing strips according to steps a–e if un-reconstructed strips containing stored data remain after reconstructing the parity strip.

6. A method of providing multiple disk fault tolerance in an array of N independent disks, the array organized into a plurality of stripes, each stripe comprising a plurality of strips, the method comprising:

partitioning the array into a plurality of logically represented N-column by R-row sets, N being an odd number and R minus 1 being less than N divided by a number of disk failures F of the array to be recovered from, so that a plurality of N-columns correspond to a plurality of disks in the array, all strips of a column are located on the same disk, and a plurality of R-rows extend across all the disks in the array;

a first portion of the strips containing stored data and a second portion of the strips containing parity values, and one and only one strip containing a parity value stored per column per set, except that at least two parity values are stored in at least one of the plurality of N-columns;

assigning each strip containing data to at least three different parity groups, so that each strip containing stored data in a respective column is assigned to parity groups different than other strips containing stored data in the same column;

calculating a parity value for each parity group, wherein the parity value corresponds to all of the strips assigned to the parity group;

storing each of the parity values in strips of different columns so that none of the strips containing stored data in a column are assigned to a parity group whose parity value is stored in that column;

wherein storing each of the parity values further comprises:

reserving at least one parity row for storing a first portion of the parity values;

reserving at least one strip in a row different from the at least one parity row for storing a second portion of the parity values;

storing each of the parity value of the first portion in respective strips of the at least one reserved parity row; and storing each of the parity values of the second portion in respective reserved strips in the row different from the at least one parity row.

7. A system for providing disk fault tolerance in an array of independent disks, comprising:

an N-column by R-row logical representation of a set of stored elements in an array of independent disks, N being an odd number and R minus 1 being less than N divided by a number of disk failures F of the array to be recovered from, the stored elements in the set organized into a plurality of stripes, each stripe comprising a plurality of strips, all strips of a column located on the same disk, a first portion of the strips containing stored data and a second portion of the strips containing parity values, except at least two parity values are stored in respective different strips of at least one of a plurality of N-columns; and an array controller coupled to the disk array and configured to:

a. assign each strip containing stored data to at least F different parity groups, F being greater than 2, so that each strip containing stored data in a respective column is assigned to parity groups different than other strips containing stored data in the same column;

b. calculate, for each parity group, a parity value corresponding to all of the strips assigned to the parity group; and c. store each of the parity values in strips of different columns so that none of the strips containing stored data in a column are assigned to a parity group whose parity value is stored in a strip of that column;

wherein storing each of the parity values further comprises:

reserving at least one parity row for storing a first portion of the parity values;

reserving at least one strip in a row different from said at least one parity row for storing a second portion of the parity values;

storing each of the parity values of the first portion in respective strips of the at least one reserved parity row; and storing each of the parity values of the second portion in respective reserved strips in the row different from the at least one parity row.

8. The system of claim 7, the array controller further configured to recover data from failed disks by:
  a. locating a first strip containing stored data on a first one of the failed disks so that none of the remaining strips containing stored data contributing to at least one of the parity groups of which the first data strip is a member of are located on the first one of the failed disks;
  b. reconstructing the first strip containing stored data on the first one of the failed disks based on an XOR operation of the other members of the parity group of which the first strip containing stored data is a member and the parity value for the group;
  c. locating a next strip containing stored data on the other failed disk, the next strip containing stored data being a member of a different parity group of which the previously reconstructed strip containing stored data is a member;
  d. reconstructing the next strip containing stored data based on an XOR operation of members of the different parity group and the parity for the different group;
  e. sequentially locating and reconstructing remaining strips according to steps c–d until no further data strips can be recreated or a parity strip on a failed disk is reconstructed; and
  f. sequentially locating and reconstructing strips according to steps a–e if un-reconstructed strips containing stored data remain after reconstructing the parity strip.

9. A computer readable media storing a data structure suitable for providing multiple disk fault tolerance for an array of independent disks, the data elements in the array of independent disks represented by an N-column by R-row logical matrix, N being an odd number and R minus 1 being less than N divided by a number of disk failures, F, from which the array is to be recovered, the data elements in the matrix organized into a plurality of matrix stripes, each matrix stripe comprising a plurality of matrix strips, all strips of a matrix column located on the same disk; each matrix strip containing data being assigned to F different parity groups so that each matrix strip containing data in a respective matrix column is assigned to parity groups different than other matrix strips containing data in the same matrix column, a respective parity value corresponding to all of the matrix strips assigned to the parity group being stored in respective matrix strips of different matrix columns so that none of the matrix strips containing data in a matrix column are assigned to a parity group whose parity value is stored in that matrix column, except that at least two mapping table entries mapped to respective parity values are stored in respective different matrix strips of at least one of a plurality of N-columns, the data structure comprising:
  an N-column by R-row mapping table, each mapping table entry mapped to a corresponding data element in the matrix and organized into mapping table columns and mapping table rows;
  each mapping table entry mapped to a respective data value in the matrix comprising F parity group identifiers, each group identifier indicative of the respective F different parity groups to which the data value has been assigned; and
  each mapping table entry mapped to respective parity value in the matrix comprising a parity value identifier, each parity value identifier indicative of the respective parity group to which the parity value belongs;
  wherein storing mapping table entries mapped to respective parity values further comprises:
  reserving at least one matrix parity row for storing a first portion of the mapping table entries mapped to respective parity values;
  reserving at least one matrix strip in a matrix row different from the at least one matrix parity row for storing a second portion of the mapping table entries mapped to respective parity values;
  storing each of the mapping table entries mapped to respective parity values of the first portion in respective matrix strips of the at least one reserved matrix parity row; and
  storing each of the mapping table entries mapped to respective parity values of the second portion in respective reserved matrix strips in the matrix row different from the at least one matrix parity row.

\* \* \* \* \*